United States Patent [19]

Baker et al.

[11] Patent Number: 4,680,621
[45] Date of Patent: Jul. 14, 1987

[54] METHOD AND APPARATUS FOR VARIABLE PHASING OF PERIODIC SIGNALS

[75] Inventors: Daniel G. Baker, Aloha; Magaret A. Feisel, Beaverton, both of Oreg.

[73] Assignee: Tektronix, Inc., Beaverton, Oreg.

[21] Appl. No.: 776,313

[22] Filed: Sep. 16, 1985

[51] Int. Cl.[4] .................... H04N 9/45; H04N 9/44; H04L 7/00; H04L 25/36
[52] U.S. Cl. ................................ 358/19; 375/118; 328/155; 358/17
[58] Field of Search .............. 358/17, 19, 10; 375/118, 120; 328/155

[56] References Cited

U.S. PATENT DOCUMENTS

| | | | |
|---|---|---|---|
| 4,403,244 | 9/1983 | Fujishima | 358/19 |
| 4,495,468 | 1/1985 | Richards et al. | 375/118 |
| 4,598,310 | 7/1986 | Brand et al. | 358/19 |

Primary Examiner—James J. Groody
Assistant Examiner—Robert M. Bauer
Attorney, Agent, or Firm—John Smith-Hill; Francis I. Gray

[57] ABSTRACT

A periodic output signal is generated at a variable phase relative to a periodic input signal by comparing the input signal with a third periodic signal that has a frequency which is less than the frequency of the input signal and that has a duty cycle which is equal to one-half of the ratio of the frequency of the third periodic signal to the frequency of the input signal. The phase difference is detected between the input signal and a frequency component of the third periodic signal which has the same frequency as the input signal. The output signal is generated at a frequency to maintain a predetermined phase relationship between the periodic input signal and the frequency component of the third periodic signal, and the phase of the output signal relative to the third periodic signal is varied. A predetermined phase relationship is maintained between the output signal and a second periodic input signal by comparing the output signal and the second input signal and generating a signal having a variable that is representative of the phase difference between them. The value of the variable is compared with a reference level representative of its value when the output signal and the second input signal are in the predetermined phase relationship, and the result of the comparison is used to control the phase of the output signal through a phase shifter to maintain the predetermined phase relationship.

11 Claims, 4 Drawing Figures

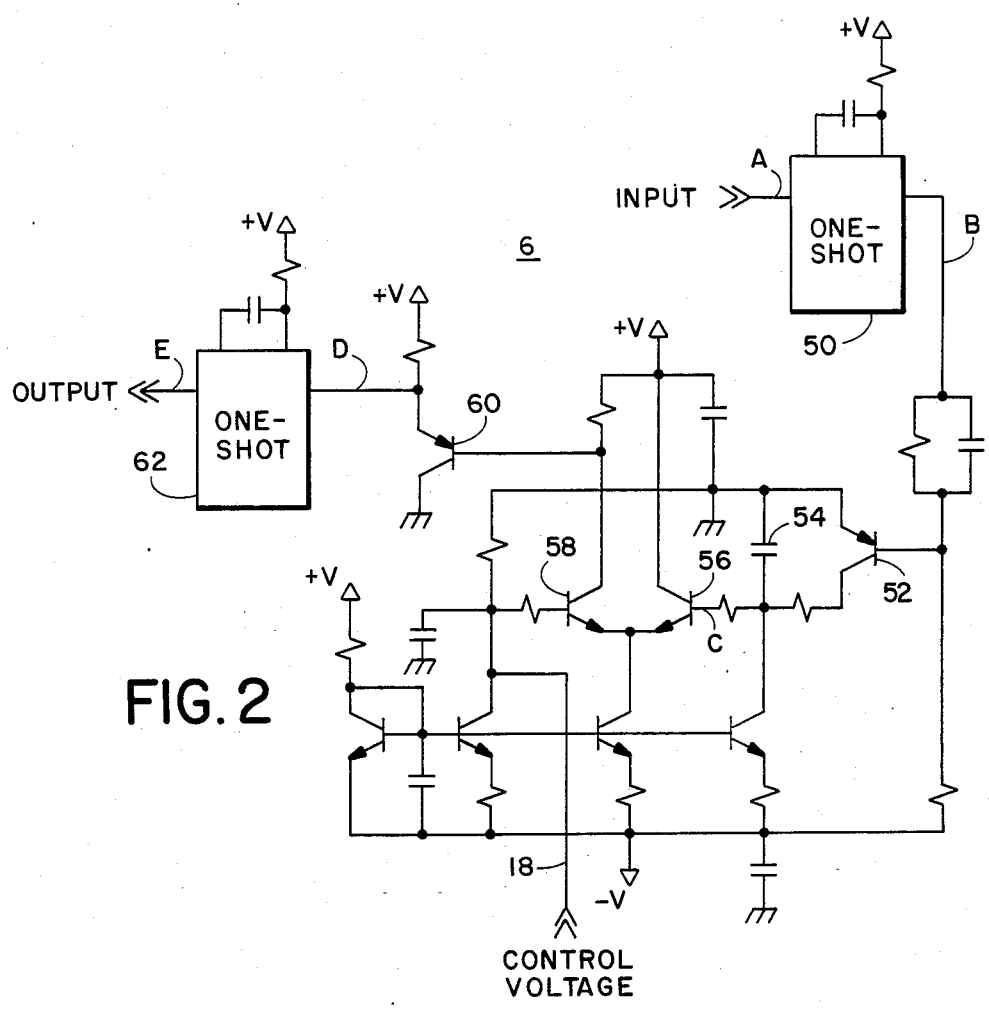

METHOD AND APPARATUS FOR VARIABLE PHASING OF PERIODIC SIGNALS

This invention relates to a method and apparatus for phasing periodic signals.

BACKGROUND OF THE INVENTION

The composite color video signals that are conventionally broadcast, for example in the NTSC (National Television System Committee) format, contain not only picture information (luminance and chrominance components) but also timing information (vertical sync pulses and horizontal sync pulses) and other reference information (e.g. equalizing pulses and color burst). The horizontal sync pulse and the color burst both occur in the horizontal blanking interval, i.e., the interval between the active line times of consecutive horizontal scan lines. The horizontal sync pulse is a negativegoing pulse, the 50 percent point of the leading edge of the sync pulse being regarded as the horizontal sync point. The color burst follows the horizontal sync pulse in the horizontal blanking interval and comprises a sinusoidal wave having a frequency of 3.58 MHz. Immediately before and after the burst the signal is at blanking level. In accordance with EIA (Electronic Industries Association) standard RS-170A, the start of burst is defined by the zero-crossing (positive or negative slope) that precedes the first half-cycle of subcarrier that is 50 percent or greater of the burst amplitude. The color burst is used in the television receiver to control a phase-locked oscillator which generates a continuous wave at subcarrier frequency and is used to extract the chrominance information from the composite video signal.

The color burst is inserted into the blanking interval at the point of origin of the composite video signal, e.g. a video camera or a video tape recorder (VTR). The sync pulse and the color burst may be generated internally of the signal source, i.e. by a sync generator and an oscillator within the signal source, but it is more common, at least in the professional video field, for the studio to have a master sync and burst generator that distributes sync and burst to all the signal sources in the studio. This insures that all signal sources have the same sync and burst frequencies.

In the production of a television program, signals from various sources are combined in a production switcher under the supervision of the program director, and the resulting signal is either distributed, e.g. by cable or broadcast transmission, in real time or is recorded for subsequent distribution. In order to avoid degradation of the picture represented by the signal when there is a switch from one source to another, it is essential not only that the horizontal and vertical sync pulses of the different signals arriving at the switcher should be in phase but also that the signals be color framed, i.e. that the fields of the signals be in phase. This implies that the color bursts of the different signals should be in phase. Accurate phasing of the color bursts cannot normally be achieved simply by use of a master burst generator, because different cable lengths between the signal sources and the switcher result in different signal transmission times, so that even if the color bursts of all the signals are in phase at the signal sources, it is almost certain that the color bursts of the different signals will not all be in phase at the switcher.

The conventional method for bringing the color bursts of the different program video signals into phase at the switcher involves the use of a vectorscope and a "black burst" reference signal. A first program video signal is applied to the video A input of the vectorscope and the reference signal is applied to the video B input. The vectorscope provides a display of a vector at an angle that depends upon the phase difference between the color burst of the first program signal and the black burst. The goniometer of the vectorscope is adjusted to align this vector with a graticule mark. The first program video signal is then disconnected and a second program video signal is applied to the video A input, and the vectorscope displays a vector at an angle that is representative of the phase difference between the burst of the second program video signal and the black burst. The phase of the burst of the second program video signal is adjusted at the signal source to align the vector with the graticule mark that the vector generated in the first comparison was aligned with. The burst of the second program video signal is then in phase with the burst of the first program video signal. This operation, which is repeated for each of the program video signals, is known as A/A phasing, to distinguish it from A/B phasing, in which two program video signals are applied to the video A input and the video B input respectively of the vector-scope. A/A phasing is normally preferred over A/B phasing, which requires matching of the cable lengths to the vectorscope, because with A/A phasing the same cable is used for each comparison and therefore the path delay or phase shift to the vectorscope does not affect the comparison.

The method described above for bringing the bursts of the different program video signals into phase at the switcher is subjective, in that it depends upon the view of the operator whether the vector generated in the second or subsequent comparison is correctly aligned with the appropriate graticule mark. Moreover, the operator must adjust the goniometer carefully on the first signal and make sure that its setting has not been changed when the second signal is tested.

SUMMARY OF THE INVENTION

In a preferred embodiment of the invention, a periodic output signal is generated at a selectively variable phase relative to a periodic input signal, by comparing the input signal with a third periodic signal that has a frequency which is less than the frequency of the input signal and that has a duty cycle which is equal to one-half of the ratio of the frequency of the third periodic signal to the frequency of the input signal. The phase difference is detected between the input signal and that frequency component of the third periodic signal which has the same frequency as the input signal. The desired output signal is generated at a frequency such as to maintain a predetermined phase relationship between the periodic input signal and the frequency component of the third periodic signal, and the phase of the output signal relative to the third periodic signal is selectively varied.

Also in the preferred embodiment of the invention, a predetermined phase relationship is established or maintained between the aforesaid output signal and a second periodic input signal, by comparing the output signal and the second input signal and generating a signal having a variable that is representative of the phase difference between the output signal and the second input signal. The value of the variable is compared with a reference level representative of its value when the output signal and the second input signal are in the predetermined phase relationship, and the result of the comparison is used to control the phase of the output signal, through the phase shifter, so as to establish or maintain the predetermined phase relationship.

BRIEF DESCRIPTION OF THE DRAWINGS

For a better understanding of the invention, and to show how the same may be carried into effect, reference will now be made, by way of example, to the accompanying drawings in which:

FIG. 2 is a schematic diagram of a part of the FIG. 1 circuit, FIG. 3 is a set of waveforms illustrating operation of the circuit shown in FIG. 2.

DETAILED DESCRIPTION

Figure 1:
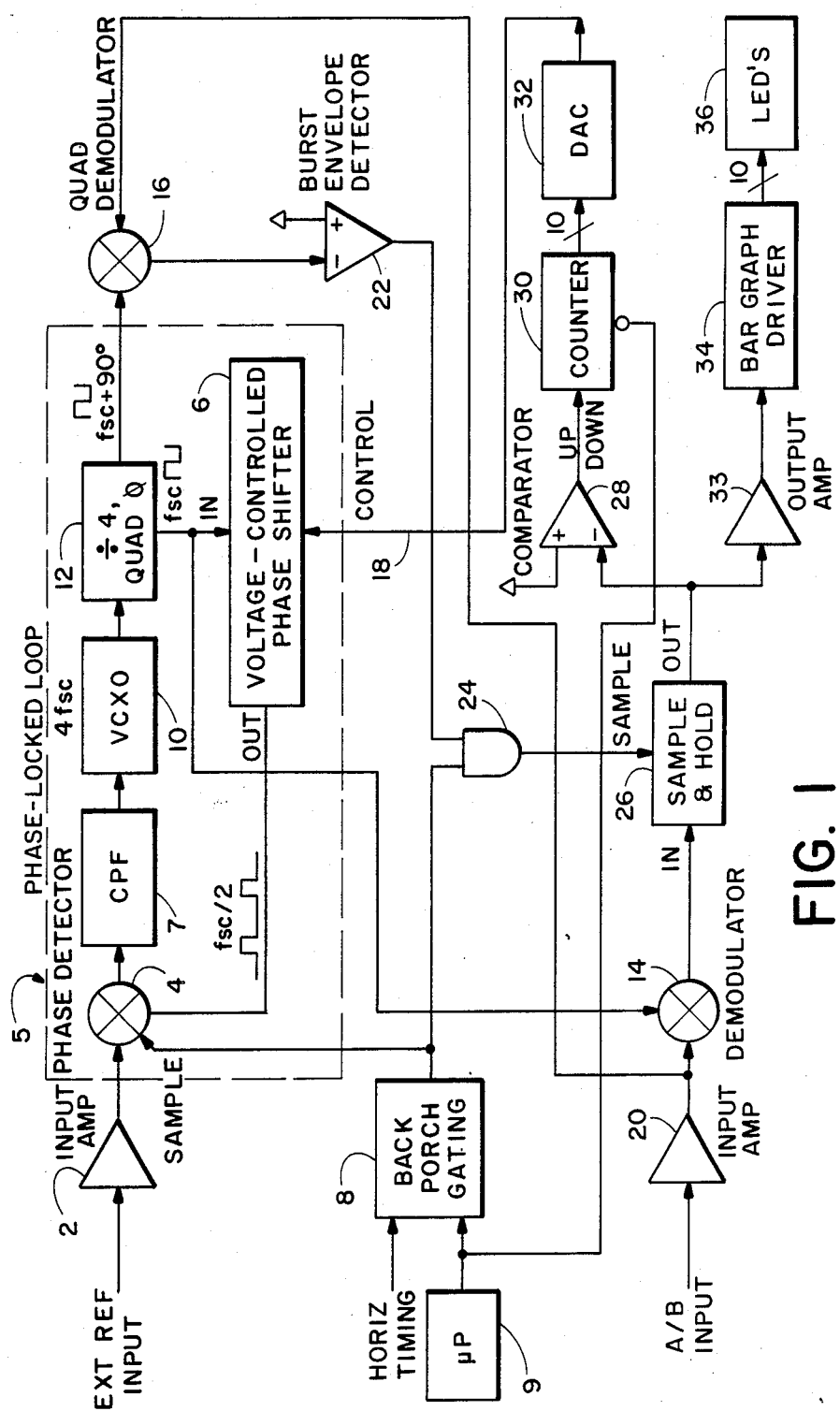
FIG. 1 is a block diagram of a circuit for establishing a desired phase relationship between video signals.

The circuit shown in FIG. 1 has two modes of operation, namely a reference set mode, in which it generates a voltage signal representative of the phase difference between the burst of an external reference signal and a first program video signal, and an A/A phasing mode, in which it can be used to bring the burst of a second program video signal into phase with the burst of the first program video signal by use of the reference voltage generated in the reference set mode. The external reference signal may be black burst or video. All three signals are genlocked together, i.e. the vertical and horizontal sync pulses of both program video signals are in phase with vertical and horizontal sync pulses of the external reference signal, and the color bursts of the three signals are of the same frequency. However, the phase relationship of the color bursts is not determined. For the reason previously indicated, it is desired to bring the color bursts of the two program video signals into phase.

The external reference signal is applied by way of an input amplifier 2 to a phase detector 4 of a phase-locked loop circuit 5. The phase detector generates an output signal having a voltage component that is representative of the difference in phase between the external reference signal and a frequency component of the output signal of a voltage-controlled phase shifter 6. The operation of the phase detector 4 is gated, by a signal provided by a back porch gating circuit 8.

The back porch gating circuit 8 receives horizontal timing information. In addition, a microprocessor 9 is connected to the circuit 8 to inhibit its operation during the vertical blanking interval, when horizontal timing information is provided to the circuit 8 but the signals do not include a color burst. The result is that the circuit 8 generates a back porch gating pulse following the horizontal sync pulses that occur during the picture interval of the program video signals.

The output of the phase detector 4 is applied through a low pass filter 7 to a voltage controlled crystal oscillator 10. The center frequency of the oscillator 10 is four times subcarrier frequency, or 14.31818 MHz in the case of the NTSC signal format. The output signal from the oscillator 10 is applied to a two-bit Moebius counter which has the effect of dividing by four the frequency of the input signal received from the oscillator 10 and generating two output signals at subcarrier frequency and in phase quadrature. In the steady state, the phase relationship between the outputs of the counter 12 and the burst of the external reference signal is fixed and is a function of the design of the phase-locked loop circuit, but the specific phase relationship is not critical.

One of the output signals of the counter 12 constitutes the output signal of the phase-locked loop circuit 5 and one is applied as an input signal to the phase shifter 6. It is shown below that the frequency of the output signal of the phase shifter is half of the frequency of its input signal, i.e. it is half of the subcarrier frequency. In order to lock the phase-locked loop circuit 5, the phase detector 4 must receive energy from the phase shifter 6 at subcarrier frequency (or an integral multiple thereof). Rather than multiply the frequency of the output signal of the phase shifter by two in order to generate a signal at subcarrier frequency for application to the phase detector, the output signal of the phase shifter is given a duty cycle of twenty-five percent in order to maximize the energy in its second harmonic, because the output signal then contains sufficient energy at subcarrier frequency to lock the circuit 5.

The phase shifter receives a control voltage at a control terminal 18. The phase shift introduced by the phase shifter 6 depends upon the voltage applied to the control terminal 18. The overall effect of the phase-locked loop comprising the components 4, 6, 7, 10 and 12 is to bring the second harmonic of the output signal from the phase shifter into a fixed phase relationship with burst of the external reference signal. Since the phase difference between the input and output signals of the phase shifter is controlled by the voltage applied to the terminal 18, the control voltage applied to the oscillator 10 adjusts the frequency of the oscillator so that in the steady state the phase difference between the burst of the external reference signal and the input signal to the phase shifter is equal to the phase shift introduced by the phase shifter, plus a constant.

The output signals of the counter 12 are applied to demodulators 14 and 16. In the reference set mode, the first of the program video signals is applied to the demodulators 14 and 16 by way of an input amplifier 20. The output of the demodulator 16 is applied to a comparator 22 which generates a burst gate pulse only during burst of the input video signal. This burst gate pulse is applied to an AND gate 24, together with the back porch gate pulse provided by the back porch gating circuit 8, and the output of the AND gate 24 is used to sample the output of the demodulator 14 using a sample and hold circuit 26. By using the burst gate pulse as well as a back porch gate pulse to define the sample time, it is ensured that the output of the demodulator is sampled only during burst, even if the position of burst varies within the back porch interval.

At the output of the sample and hold circuit 26 is developed a d. c. voltage proportional to the phase relationship between the burst of the first program video input signal and the input signal to the phase shifter 6. This burst level d. c. voltage is applied to a comparator 28 which compares the burst level with the d. c. voltage level corrsponding to a desired phase relationship between the burst of the program video signal and the burst of the external reference signal (hereinafter referred to as the zero level) and generates an output voltage having one of two states, depending on whether or not the burst level exceeds the zero level. The output voltage of the comparator is used to control the counting direction of an up/down counter 30, which is enabled under control of the microprocessor. The output of the counter is applied to a digital-to-analog converter (DAC) 32, and the analog output voltage of the DAC 32 is applied to the control terminal 18 of the phase shifter 6. The output of the sample and hold circuit 26 is also applied through an output amplifier 33 to a bar graph driver 34 that is connected to an LED bar graph 36. The LED bar graph 36 comprises an array of ten LED's. When the burst level is equal to the zero level, an LED near the center of the array is illuminated, whereas when the burst level increases or decreases from the zero level the LEDs towards one or other end of the array are illuminated.

In the reference set mode of operation, the microprocessor enables the counter 30, and the output of the comparator 28 accordingly acts through the counter 30 and the DAC 32 to adjust the phase difference introduced by the phase shifter (and thereby change the phase of the input signal to the phase shifter 6) so as to bring the input signal applied to the phase shifter (and to the demodulator 14) into a predetermined phase relationship with the burst of the first program video signal. When the burst level and the zero level are nearly equal, the output signal from the comparator 28 will toggle rapidly between its two states, moving the burst level alternately slightly above and slightly below the zero level. In this state, the center LED of the bar graph 36 is illuminated. When sufficient time has elapsed to insure that the proper count has been reached, the microprocessor 9 switches the circuit to its A/A phasing mode of operation. In this mode, the output of the counter 30 is maintained, and accordingly the phase of the input signal to the phase shifter 6 remains fixed. In the A/A phasing mode, the second program video signal is applied to the A/B input terminal, and the burst level (the level of the d. c. output voltage from the sample and hold 26) is representative of the phase difference between the burst of the second program video signal and the input signal of the phase shifter 6 (which is in the aforesaid predetermined phase relationship with the burst of the first program video signal). This burst level voltage is applied to the driver 34 which causes an LED of the bar graph 36 to be illuminated, and the burst of the second program video signal is then adjusted until the center LED is illuminated, indicating that the burst of the second program video signal is then in the same predetermined phase relationship with the input signal to the phase shifter 6. The bursts of the first and second program video signals are then in phase.

The voltage-controlled phase shifter 6 is shown in greater detail in FIG. 2. The phase shifter 6 receives an input signal (FIG. 3A) at subcarrier frequency ($F_{sc}$) and having a fifty percent duty cycle. This input signal is applied to a one-shot 50 which generates a short, negative-going pulse (FIG. 3B) every second positive-going pulse at the input of the one-shot. The output signal from the one-shot 50, at half subcarrier frequency, is applied to a transistor 52 which turns on, rapidly charging a capacitor 54. The capacitor then discharges for the remainder of the two-subcarrier-cycle period of the output signal of the one-shot 50, producing a negative-going ramp which extends for more than 360 subcarrier degrees. This ramp is applied to one input terminal of a comparator formed by two emitter-coupled transistors 56 and 58. The other input terminal of the comparator is the terminal 18. The comparator provides a pulse output each time the ramp voltage level decreases through the level of the control voltage applied to the terminal 18, and the pulse output of the comparator drives a transistor 60. The output signal of the transistor 60 is applied to a one-shot 62 which generates an output pulse having a duration of 140 ns. Since the ramp voltage is generated at half subcarrier frequency, this implies that, under steady state conditions, the output signal of the one-shot 62 is also at half subcarrier frequency and has a duty cycle of twenty-five percent. The phase of the output signal from the one-shot 62 relative to the input signal applied to the one-shot 50 depends upon the voltage level of the control voltage, and is adjustable over more than 360 subcarrier degrees since the ramp itself has a duration of more than one subcarrier period.

The voltage-controlled phase shifter described with reference to FIG. 2 is somewhat similar to the circuit described in U.S. Pat. No. 4,360,747 issued Nov. 23, 1982, but avoids certain disadvantages of that circuit. For example, the circuit described with reference to FIG. 2 avoids the need for a crystal filter at the output, and generates sufficient energy at subcarrier frequency by use of the one-shot 62.

Some modern video equipment, such as cameras and test signal generators, may have a control bus that allows remote control of burst phase. The sample and hold 26 could be used to provide an analog control signal or the output of the comparator 28 could be used as a binary control signal. In either case, the control signal could be used by a microprocessor controller to adjust the phase of the burst to maintain a predetermined phase at the measurement point. This phase relationship between the burst of the first program video signal and the burst of the external reference signal is stored in the counter 30 in the reference set mode, and in the A/A phasing mode the output of the sample and hold 26 or the comparator 28 is used by the microprocessor controller to adjust the burst phase of the second program video signal. Cable lengths between the source of the second program video signal and the measurement point may be varied without introducing phase error.

Figure 4:
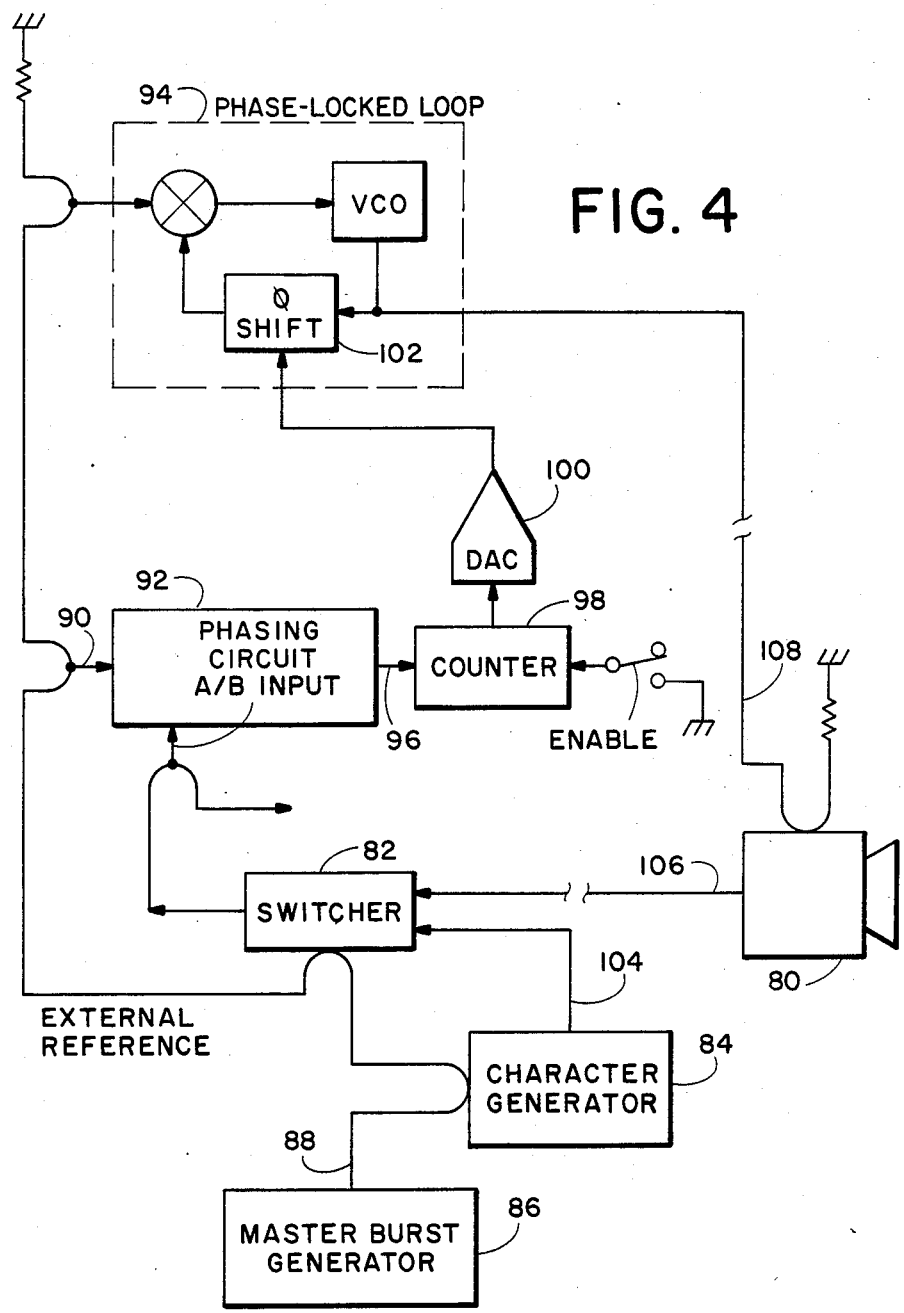
FIG. 4 is a block diagram of a circuit for automatically establishing a desired phase relationship between video signals.

FIG. 4 illustrates a circuit that may be used to control the burst phase of a standard genlock camera 80, i.e. one without a control bus. The FIG. 4 circuit includes as one of its elements the circuit of FIG. 1, designated 92. The camera 80 has its video signal output connected to a production switcher 82. The switcher is used to form a signal representing a composite image from the signal provided by the camera 80 and at least one other signal, such as a signal provided by a character generator 84. A master burst generator 86 generates a black burst reference signal which is applied over a line 88 to the character generator 84, the production switcher 82 and the external reference input 90 of the circuit 92. The line 88 is also connected to an auxiliary phase-locked loop circuit 94, which is identical to the circuit 5 shown in FIG. 1. The circuit 92 has an output terminal 96 connected to the output of the comparator 28, and this output terminal is connected to a counter 98. The digital output of the counter 98 is converted to analog form by a DAC 100 and is applied to the control input of the phase shifter 102 of the circuit 94. The signal input terminal to the phase shifter 102 is connected to the external burst reference input of the camera 80.

The character generator and the production switcher are both control room equipment, and therefore the length of the cable 104 connecting the character generator to the switcher does not normally change. The camera, however, may be used at different locations and so the length of the cable 106 may change. Both the circuit 92 and the auxiliary PLL circuit 94 are also control room equipment, and so the length of the cable 108 connecting the circuit 94 to the camera 80 may change.

By connecting the circuit 92 in the manner shown in FIG. 4, it is given a third mode of operation, namely an auxiliary servo mode.

On initial set-up, the switcher is used to make available successively at its program output the character generator's output signal and the reference burst as applied to the switcher over the line 88, and the circuit 92 is used in its reference set and A/A phasing modes to bring the burst of the character generator's output signal into phase with the switcher's reference burst at the program output of the switcher. In the auxiliary servo mode, the counter 98 is enabled and the production switcher selects the video signal from the camera 80. The auxiliary PLL circuit 94 then automatically brings the burst of the camera video signal into phase with burst of the character generator's output signal. Upon release of the enable switch, the counter maintains its count and the circuit 94 maintains a constant phase relationship between the burst of the camera video signal and the burst of the external reference signal.

Since selection of the signal that is looped through the A/B input of the circuit 92 is accomplished by means of the switcher, the length of the cable leading to the A/B input is unimportant, and a change in the length of that cable has no effect on the phase relationship among the bursts of the various video signals.

If the lengths of the cables connected to the camera 80 are changed, or the camera genlock drifts, the camera signal can be selected again by the switcher and the counter 98 enabled to bring the burst of the camera signal back into phase with the burst of the character generator signal at the switcher output.

It will be appreciated that by phasing the different video signals at the output of the switcher instead of at the input, it becomes unnecessary to take account of the possibility of there being different delays in different signal paths within the switcher.

It will be apreciated that the present invention is not restricted to the particular embodiments that have been described and illustrated, and that variations may be made therein without departing from the scope of the invention as defined in the appended claims, and equivalents thereof. By way of example only, whereas the circuit described with reference to FIG. 1 is for use in establishing a desired phase relationship between video signals conforming to the NTSC standard, the invention may also be used to provide a circuit for establishing a desired phase relationship between PAL signals. In this case, the microprocessor controls the circuit 8 so that the back porch gate pulse is generated on alternate lines. Therefore, the phaselocked loop locks to only one of the PAL burst vectors and the output of the demodulator 14 is sampled for the same vector. Of course, the frequency of the oscillator 10 would be 17.734 MHz, which is four times the subcarrier frequency of the PAL standard. Moreover, the external reference signal may be a continuous wave signal at subcarrier frequency, in which case the phase detector 4 need not be gated.

We claim:

1. A method of generating a periodic output signal at a selectively variable phase relative to a periodic input signal, comprising comparing the input signal with a third periodic signal that has a frequency which is less than the frequency of the input signal and that has a duty cycle which is equal to one-half of the ratio of the frequency of the third periodic signal to the frequency of the periodic input signal, detecting the phase difference between the input signal and that frequency component of the third periodic signal which has the same frequency as the input signal, generating said output signal at a frequency such as to maintain a predetermined phase relationship between the periodic input signal and said frequency component, and selectively varying the phase of said output signal relative to said third periodic signal.

2. A phase-locked loop circuit comprising:
controllable oscillator means having an output terminal and a control terminal, said controllable oscillator means generating at the output terminal a periodic output signal at a frequency that depends on a control signal applied to the control terminal,
a phase detector having a first signal input terminal for receiving a periodic input signal, a second signal input terminal for receiving a third periodic signal, and an output terminal connected to the control terminal of the controllable oscillator to provide a control signal representative of the phase difference between the periodic input signal and a frequency component of said third periodic signal, and
a controllable phase shifter having an input terminal for receiving the periodic output signal of the controllable oscillator means, an output terminal connected to the second signal input terminal of the phase detector, and a phase control terminal for receiving a phase control signal to adjust the phase of said output signal relative to said third periodic signal, said controllable phase shifter generating at its output terminal the third periodic signal at a frequency which is less than the frequency of the periodic input signal and having a duty cycle equal to one-half of the ratio of the frequency of the third periodic signal to the frequency of the periodic input signal.

3. A phase-locked loop circuit according to claim 2, for receiving as the periodic input signal a video signal having a color burst, and wherein the third periodic signal is a continuous wave signal and the circuit comprises a gating device for enabling the phase detector only during the back porch of the video signal.

4. A phase locked loop circuit according to claim 2, wherein the controllable oscillator means comprises a voltage-controlled oscillator having a mid-range frequency equal to an integral multiple of the frequency of the color burst of the input signal, and a counter for dividing the output frequency of the voltage-controlled oscillator to provide said output signal.

5. A phase-locked loop circuit according to claim 2, wherein said controllable phase shifter is operative to generate at its output terminal a rectangular wave signal at half the frequency of said output signal and having a duty cycle of 25 percent.

6. A phase-locked loop circuit according to claim 5, wherein said controllable phase shifter is a voltage-controlled phase shifter that comprises a ramp generator for generating a voltage ramp signal at half the frequency of said output signal, a comparator having a first input terminal for receiving said voltage ramp signal, a second input terminal for receiving the phase control voltage applied to the phase control terminal, and an output terminal at which a pulse output is provided when the relationship between the voltage levels at said first and second input terminals changes from a condition in which the voltage at one of said terminals is less than the voltage at the other terminal to a condition in which the voltage at said one terminal is greater than that at the other terminal, and a one-shot multivibrator for receiving said pulse output and generating in response thereto a pulse having a duration equal to one-half the period of said output signal.

7. A method of establishing or maintaining a predetermined phase relationship between first and second periodic signals, the first signal being an output signal of a phase-locked loop circuit, comprising the steps of:
   demodulating the second signal against the first signal and generating a third signal having a variable representative of the phase relationship between the first and second signals,
   comparing said variable of the third signal with a reference level representative of the value of the variable when the first and second signals are in said predetermined phase relationship, and
   using the result of the comparison to control the phase of the first periodic signal so as to establish or maintain said predetermined phase relationship.

8. A method according to claim 7, wherein the step of controlling the phase of the first periodic signal is accomplished by using the third signal to generate a voltage representative of any difference between said predetermined phase relationship and the phase relationship between the first and second signals and applying the voltage to a voltage-controlled phase shifter included in the phase-locked loop.

9. A method as recited in claim 7 further comprising the step of using the third signal to provide an indication of said phase relationship.

10. Apparatus for establishing or maintaining a predetermined phase relationship between first and second periodic signals comprising:
    a phase-locked loop circuit having an output signal, the output signal being the first periodic signal,
    means for demodulating the second signal against the first signal and generating a third signal having a variable representative of the phase relationship between the first and second signals,
    means for comparing the variable of the third signal with a reference level representative of the value of the variable when the first and second signals are in said predetermined phase relationship, and
    means for controlling the phase of the first periodic signal in dependence upon the output of the comparison means so as to establish or maintain said predetermined phase relationship.

11. Apparatus as recited in claim 10 further comprising means for providing an indication of the phase relationship in dependence upon the third signal.

* * * * *